No. 706,818. Patented Aug. 12, 1902.
G. E. GRIMM.
MACHINE FOR MAKING SPIRAL TUBING.
(Application filed Nov. 30, 1900. Renewed Jan. 20, 1902.)
(No Model.)
3 Sheets—Sheet 1.

No. 706,818. Patented Aug. 12, 1902.
G. E. GRIMM.
MACHINE FOR MAKING SPIRAL TUBING.
(Application filed Nov. 30, 1900. Renewed Jan. 20, 1902.)

(No Model.) 3 Sheets—Sheet 2.

Witnesses:

Inventor.
Gerhardt E. Grimm
by
Augustus B. Houghton
Attorney

THE NORRIS PETERS CO., PHOTO-LITHO., WASHINGTON, D. C.

No. 706,818. Patented Aug. 12, 1902.
G. E. GRIMM.
MACHINE FOR MAKING SPIRAL TUBING.
(Application filed Nov. 30, 1900. Renewed Jan. 20, 1902.)
(No Model.) 3 Sheets—Sheet 3.

UNITED STATES PATENT OFFICE.

GERHARDT E. GRIMM, OF CAMDEN, NEW JERSEY, ASSIGNOR TO SIDNEY MASON.

MACHINE FOR MAKING SPIRAL TUBING.

SPECIFICATION forming part of Letters Patent No. 706,818, dated August 12, 1902.

Application filed November 30, 1900. Renewed January 20, 1902. Serial No. 90,549. (No model.)

*To all whom it may concern:*

Be it known that I, GERHARDT E. GRIMM, a citizen of the United States, residing at the city of Camden, in the county of Camden and State of New Jersey, have invented certain new and useful Improvements in Machines for Making Spiral Tubing, of which the following is a specification.

Objects of the present invention are to provide a comparatively inexpensive, reliable, and efficient machine for making spiral tubing, to simplify the adjustment of the machine to different kinds of work, and to provide for the production of satisfactory spiral tubes.

To these and other ends, hereinafter explained, the invention comprises the improvements about to be described, and pointed out in the claims.

The nature, characteristic features, and scope of my invention will be more fully understood from the following description, taken in connection with the accompanying drawings, forming part hereof, and in which—

Figure 1:
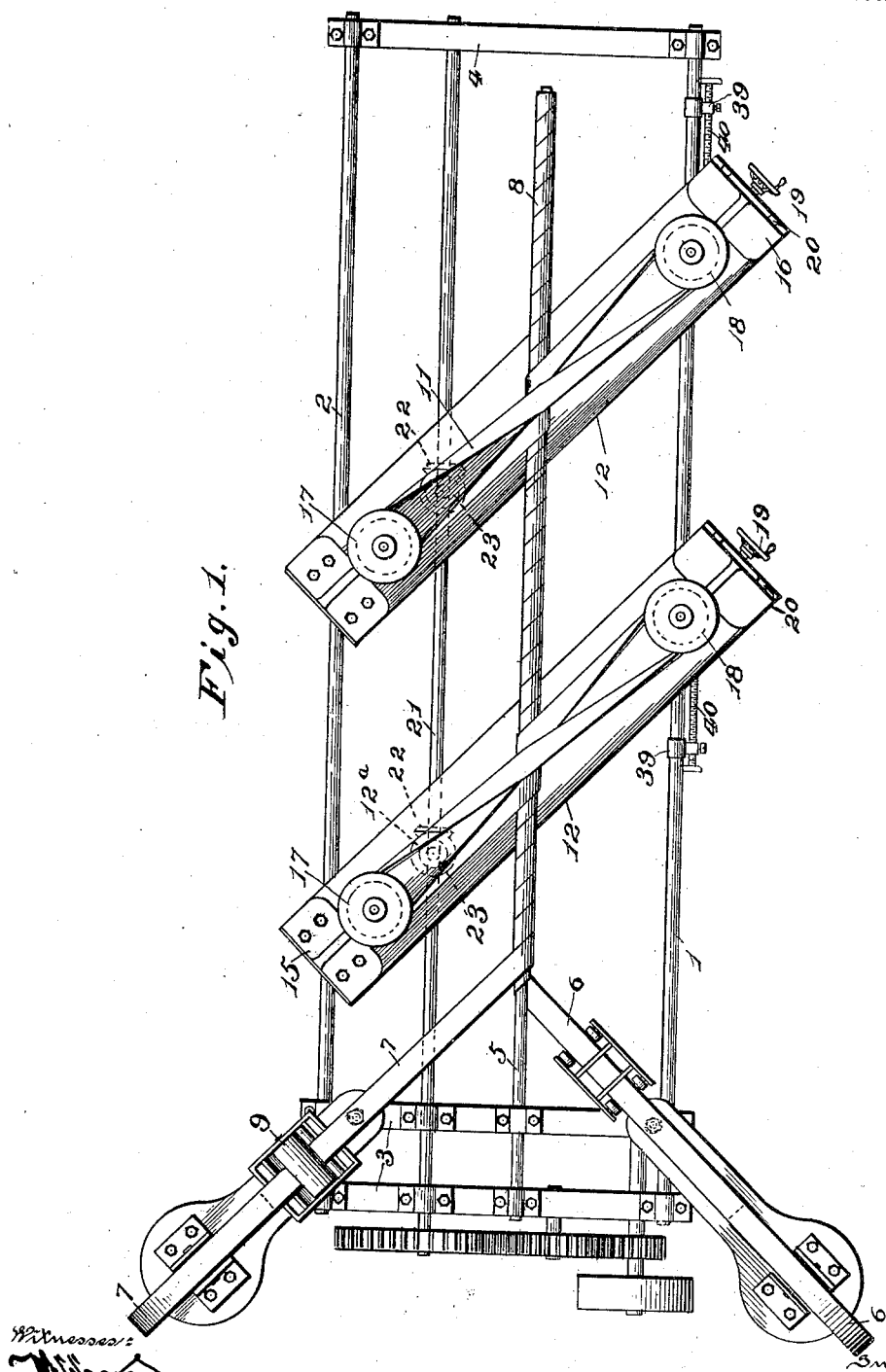
Figure 2:
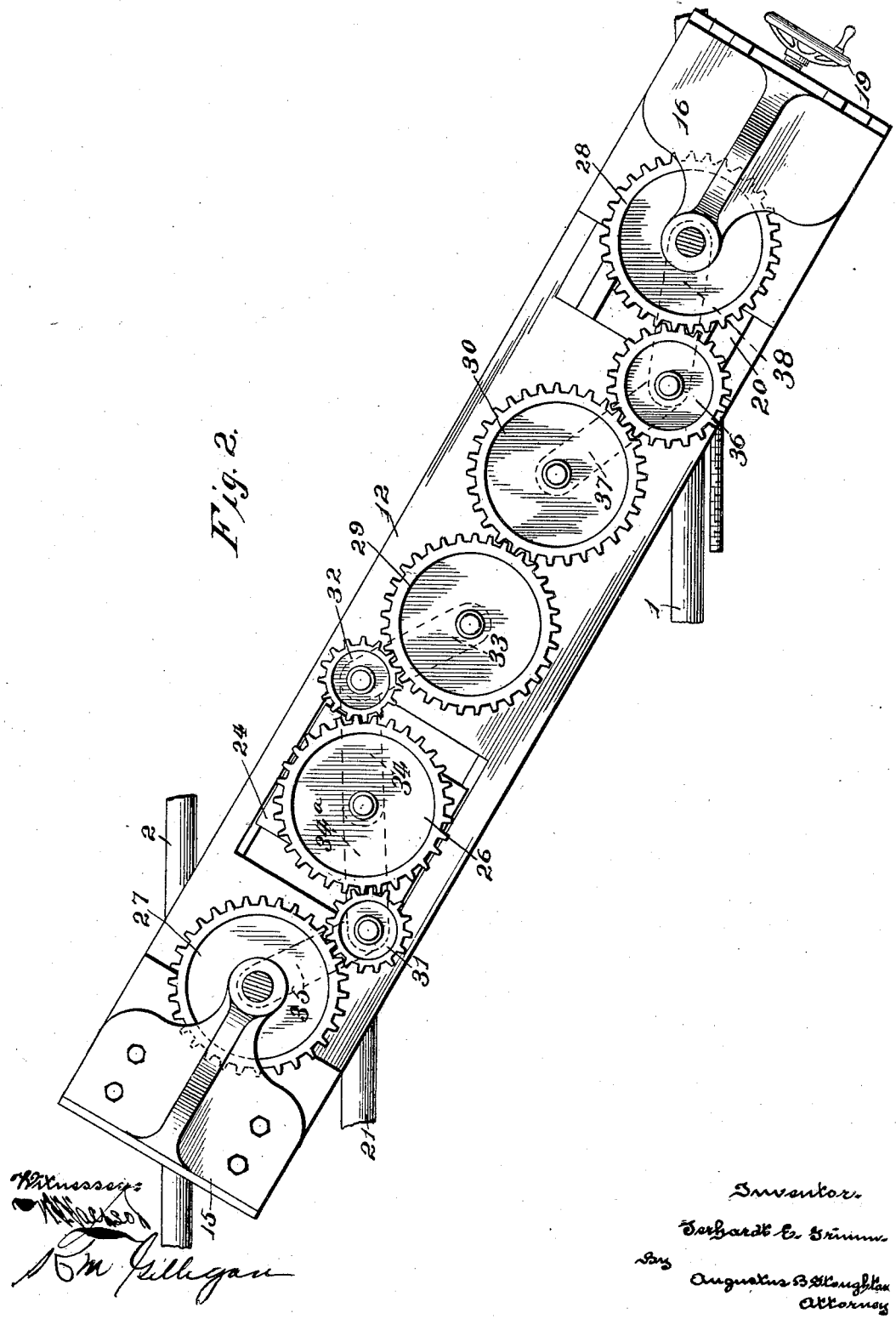
Figure 3:
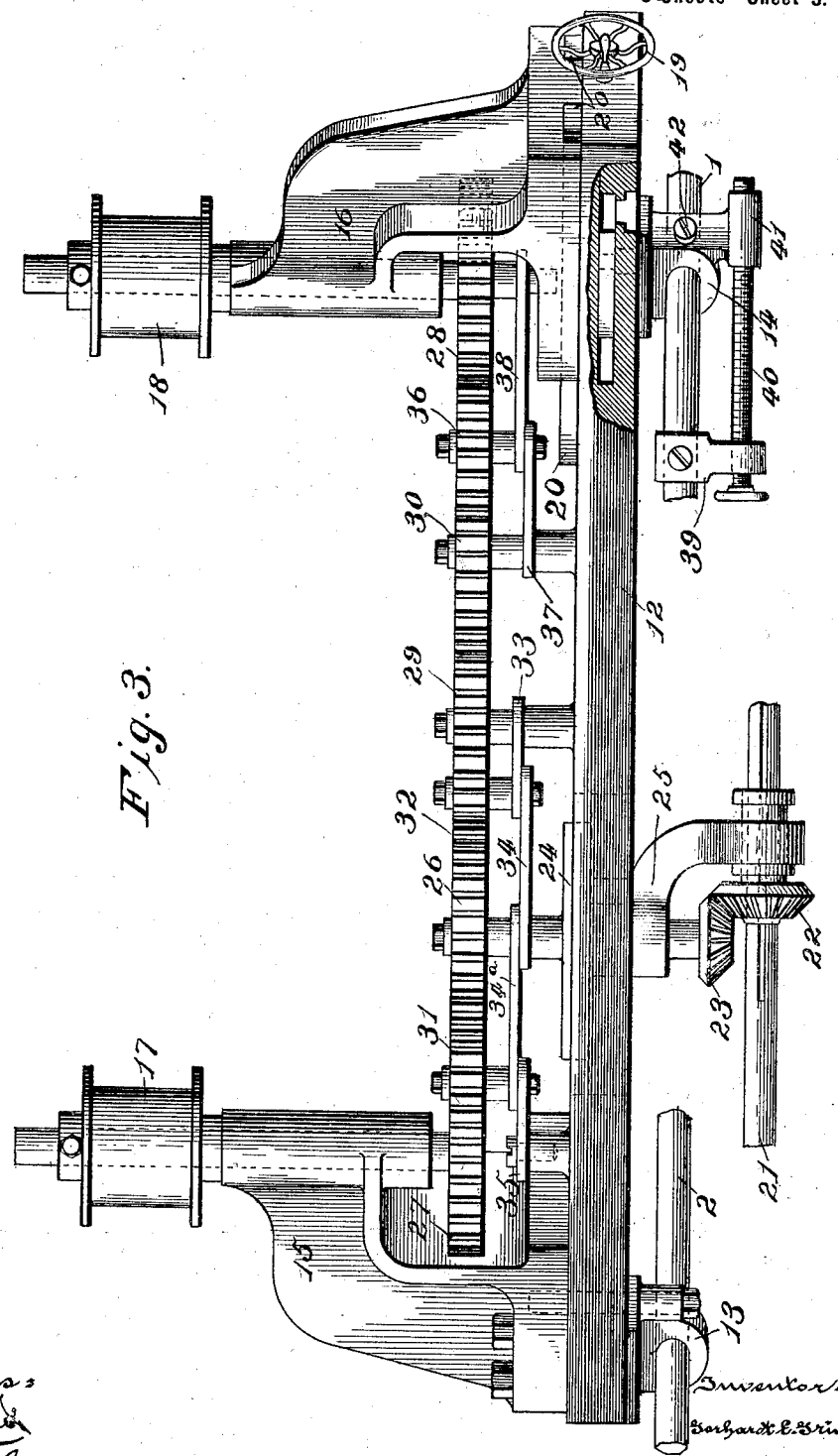

Figure 1 is a top or plan view of a machine embodying features of the invention, showing the gear-cases in position; and Figs. 2 and 3 are respectively a top and a side view of one of the pivoted arms with the gear-case removed.

In the drawings, 1 and 2 are parallel ways, which are illustrated as secured to or carried by end pieces 3 and 4. The ways 1 and 2 may be supported in any convenient manner, and they are shown as of circular cross-section; but these are details.

5 is a mandrel upon which the strips, as 6 and 7, are wound to form the tube 8. The strips are shown as being fed from suitable reels and guides, and 9 indicates an arrangement for applying paste or the like to one of them.

11 and 12$^a$ are belts which take a turn around the tube 8 and to which power is applied, as will be hereinafter described, so that the belts operate to make the tube. Power is applied to the belts, and they must be capable of adjustment in order to compensate for the introduction of strips of different widths, and it is convenient to provide means for tightening them. A description will now be given of one set of parts by which these results are accomplished, and by referring to the reference-numerals the other set will be understood, and the number of sets may be increased or diminished.

12 is an arm pivoted at or near one of its ends to a pivot-block 13, mounted on the way 2. At its other end this pivoted arm 12 has sliding engagement with a guide 14, which in its turn is arranged so as to be capable of sliding on the way 1, and this guide comprises two parts pivoted together. The pivoted arm 12 is provided with brackets 15 and 16, on which are rotatably mounted pulleys 17 and 18 for the belts. The bracket 16 may be adjusted by means of the hand-wheel 19 back and forth on the ways 20, so as to shift it in respect to the bracket 15 and in that way tighten or loosen the belt. The shaft 21 is the power-shaft, and there is splined upon it a driving gear-wheel 22. Of course this gear-wheel 22 may be otherwise mounted, so as to slide endwise of and turn with the shaft 21. This driving gear-wheel 22 meshes with the following gear 23. The latter is journaled in a traveler 24, which is free to slide endwise of the pivotal arm 12 and which is located intermediate of its ends. The driver 22 is held in mesh with the follower 23 by the arm or bracket 25 of the traveler 24. The part 25 moves with the traveler 24 and engages collars (one or more) on the hub of the driver 22. The follower 23 is fast to a shaft sleeved through the traveler 24 and having at its upper end a toothed wheel 26.

27 is a gear-wheel for driving the belt-pulley 17, and 28 is a gear-wheel for driving the belt-pulley 18.

29 and 30 are intermeshing idle wheels respectively mounted on studs or journals fixed in respect to the arm 12.

31 and 32 are intermediate toothed wheels which mesh with their neighbors and are journaled on movable studs. In the embodiment of the invention shown in the drawings they are journaled on what may be termed "floating studs." These studs form hinges for the ends of levers or links 33, 34, 34$^a$, and 35, of which 33 and 35 are pivoted to the pivotal arm 12 and of which the levers 34 and 34$^a$ are pivoted to the traveler 24.

36 is another intermediate wheel meshing with its neighbors and mounted on a floating stud forming the hinge between the levers 37 and 38, which are pivoted to the axes of the wheels 28 and 29, and in this connection it may be remarked that the points at which the levers 33, 34, 34ª, and 35 are pivoted to the arm 12 and traveler 24 are concentric with the axes of the wheels 29, 26, and 27. When the bracket 16 and wheel 28 are shifted to tighten or loosen the belt, the levers 37 and 38 shift the floating stud in such a way that the gear-wheel 36 remains in mesh with its neighbors. When the pivoted arm 12 is turned about its left-hand end as a pivot, the bevel-gears 22 and 23 are held in mesh with each other by the arm 25, which also serves to slide the bevel-gear 22 along its shaft 21. At the same time the traveler 24 slides in respect to the pivotal arm, and the described system of levers 33, 34, 34ª, and 35 automatically shifts the floating studs of the intermediate wheels 31 and 32 in such a way that they remain in mesh with their neighbors and permit of the shifting of the axes of the wheel 26, which necessarily takes place when the traveler 24 is shifted.

39 is a clamp adapted to the way 1 and provided with a micrometer-screw 40, which engages a nut 41, secured to the right-hand end of the pivotal arm 12.

42 is a set-screw. By releasing this set-screw 42 and securing the clamp 39 to the way 1 and by properly manipulating the micrometer-screw it is possible to effect a very accurate adjustment in turning the pivoted arm 12 about its pivoted end, which is the left-hand end on the drawings, Fig. 3. By releasing the clamp 39, as well as the set-screw 42, the free end of the pivoted arm 12 may be shifted manually or in any preferred manner. However, the micrometer-screw 40 affords convenient means for rapidly making a comparatively slight and very accurate adjustment of these heavy parts.

It will be obvious to those skilled in the art to which my invention appertains that modifications may be made in details without departing from the spirit thereof. Hence I do not limit myself to the precise construction and arrangement of parts hereinabove set forth, and illustrated in the accompanying drawings; but,

Having thus described the nature and objects of my invention, what I claim as new, and desire to secure by Letters Patent, is—

1. A machine for making spiral tubing comprising parallel ways and a power-shaft, strip-guides and their accessories, an arm pivoted near its end to one of said ways and having sliding contact at its other end with the other of said ways, belt-pulleys carried by said arm, a belt and a mandrel, a traveler intermediate of the points of pivotal support and sliding contact of the arm and carrying intermeshing bevel gear-wheels of which one is splined to the power-shaft, a train of gear-wheels driven by the other bevel gear-wheel and operatively connected with the pulleys, and movable studs for intermediate wheels of the last-mentioned train.

2. A machine for making spiral tubing comprising parallel ways and a power-shaft, strip-guides and their accessories, an arm pivoted near its end to one of said ways and having sliding contact at its other end with the other of said ways, belt-pulleys carried by said arm, a belt and a mandrel, a traveler intermediate of the points of pivotal support and sliding contact of the arm and carrying intermeshing bevel gear-wheels of which one is splined to the power-shaft, a train of gear-wheels driven by the other bevel gear-wheel and operatively connected with the pulleys, movable studs for the intermediate wheels, and means for shifting one of said pulleys to tighten or loosen the belt.

3. In a machine of the class described the combination of an arm pivoted at or near one of its ends and provided with belt-pulleys, a power-shaft, a traveler located intermediate of the ends of the arm and carrying a pair of intermeshing bevel-wheels of which one is splined to the power-shaft, a toothed wheel carried by the traveler and connected with the other bevel gear-wheel, a train of gear-wheels for driving said pulleys, intermediate wheels between the toothed wheel and the train of gear-wheels, and movable studs for the intermediate wheels, substantially as described.

4. In a machine of the class described, the combination of an arm pivoted at one of its ends, a way having sliding engagement with the other end of the arm, and a screw fastened to the way and the last-mentioned end of the arm for both shifting and holding the latter, substantially as described.

5. The combination in a machine of the class described of a movable arm, a way, a guide having sliding engagement with the way and with the arm, means for clamping and unclamping the guide, a clamp adapted to the way, and a screw interposed between the clamp and arm, substantially as described.

In testimony whereof I have hereunto signed my name.

GERHARDT E. GRIMM.

In presence of—
CHAS. ROGERS, Jr.,
GEO. S. BARROWS.